July 11, 1967  C. A. CORDNER  3,330,508
AERIAL DISPERSAL SYSTEM FOR FLUIDS
Filed Sept. 20, 1965  2 Sheets-Sheet 1

INVENTOR.
CLYDE A. CORDNER
BY Knox & Knox

July 11, 1967 C. A. CORDNER 3,330,508
AERIAL DISPERSAL SYSTEM FOR FLUIDS
Filed Sept. 20, 1965 2 Sheets-Sheet 2

INVENTOR.
CLYDE A. CORDNER
BY Knox & Knox

United States Patent Office 3,330,508
Patented July 11, 1967

3,330,508
AERIAL DISPERSAL SYSTEM FOR FLUIDS
Clyde A. Cordner, San Diego, Calif., assignor to The Ryan Aeronautical Co., San Diego, Calif.
Filed Sept. 20, 1965, Ser. No. 488,327
8 Claims. (Cl. 244—136)

The present invention relates to material distribution and dispersion and specifically to an aerial dispersal system for fluids.

Fluids can be dispersed over a predetermined area in many different ways, such as by spraying, aerial dropping through a suitable outlet, scattering by bursting from bomb or shell type containers by explosives or pressure, and other such means. For some fluids in non-critical situations such methods are satisfactory, but for certain specialized chemicals or fluid materials which must be dispersed accurately in a controlled manner, different techniques are necessary. Included in the special category are smoke screen producing chemicals, which must be precisely distributed to be effective, and bacteriological agents of certain types. The latter may be damaged or rendered ineffective by sudden pressure or temperature changes incurred in nozzle discharge or explosive scattering. Also, in dropping such agents from an aircraft, the airflow may scatter the material unnecessarily by turbulence and contamination of the delivering aircraft is a possibility.

The primary object of this invention, therefore, is to provide a system for aerial dispersal of a fluid in a controlled pattern in the form of a generally vertical curtain, which can be distributed accurately along a chosen line or perimeter.

Another object of this invention is to provide fluid dispersal means which can be carried on an aircraft or launched from the ground.

Another object of this invention is to provide a fluid dispersal system which ensures uniform dispersion along the full length of the line of distribution.

A further object of this invention is to provide a fluid dispersal system in which the rate of dispersal is readily controlled.

Another object of this invention is to provide fluid dispersing means which is suitable for prolonged storage with many fluids, yet is ready for immediate use.

The dispersal unit and its method of use are illustrated in the drawings, in which:

FIGURE 1 is a side elevation view, partially cut away, of a complete dispersal unit;

FIGURE 2 is a view similar to a portion of FIGURE 1 but showing the initial extraction operation of the fluid carrying element;

FIGURE 3 is a sectional view taken on line 3—3 of FIGURE 1;

FIGURE 4 is an enlarged perspective view of a portion of the fluid carrying dispersal element;

FIGURE 5 is a diagrammatic view of the unit in an aerial dispersal operation; and FIGURE 6 is a top plan view, on a reduced scale, of a unit fitted with rockets for ground launching.

Similar characters of reference indicate similar or identical elements and portions throughout the specification and throughout the views of the drawings.

*Dispersal unit*

The unit 10 comprises a streamlined casing 12 suitable for carrying on an aircraft, the casing having suspension fittings 14 for attachment to conventional bomb or store racks of an aircraft.

As illustrated the casing has an inner container 16 for containing the fluid to be dispersed, but the casing itself may be used as the container if the structure is adequately sealed. Container 16 has a conveniently located filler connection 18, which may be in the nose as shown and is accessible through a nose cap 20 in casing 12. The filler connection 18 is valved or otherwise made sealable in any well known manner and is adapted to receive a hose or other means for extracting air and admitting fluid, as hereinafter described.

The rear end of casing 12 is formed by a detachable tail cone 22 secured to the casing by releasable couplings 24, which may be explosive bolts actuated by a timer 26, or similar means. Various mechanisms have been developed to jettison a portion of structure at a predetermined time and several well known arrangements are adaptable to the present unit. At the separation the rear end of casing 12 is fitted with a transverse bulkhead 28 and container 16 has a smoothly contoured nozzle 30 which projects through the bulkhead. Nozzle 30 is sealed by a plug 32, which is connected to a drogue or drag chute 34 suitably packed inside tail cone 22 and held in place by a retaining plate 36 secured to said plug. The drag chute 34 is not intended to support the dispersing element, but is merly large enough to develop drag for extracting the element from the casing. Other parachute arrangements or extraction means to remove the plug may be equally suitable.

The fluid material is carried in a linear dispersing element 38 composed of a body of open pored foam or sponge-like material reinforced by a longitudinal inelastic extension line 40 of cord, wire, or the like, to prevent stretching or breakage of the porous material.

The dispersing element can be molded or otherwise formed around the extension line 40, or may be longitudinally split for insertion of the line, then bonded together. One end of the extension line 40 is secured to plug 32, the dispersing element 38 being stored within inner container 16. A convenient method of storing a very long length of the element is by spirally winding coils in axially stacked arrangement, as illustrated in FIGURES 1 and 3. The rectangular cross section of the dispersing element 38, shown in FIGURE 4, ensures maximum usage of available space, but other cross sectional shapes may be used for specific purposes.

*Preparation and deployment*

The preferred method of loading the fluid into the unit includes first extracting all air from the inner container 16 by connecting a vaccum pump to connection 18. The open pore nature of dispersing element 38 ensures that all air will be extracted, which is important when using chemical smoke producing agents actuated by exposure to air. A source of the fluid to be carried is then coupled to connection 18 and the fluid admitted to fill the pores of the dispersing element. Inert gas or other additives may be used where necessary and many fluids can be stored for prolonged periods in the unit.

The unit is carried by an aircraft which is flown in the direction of the required line of dispersion. The altitude of release will depend on the fluid being used, the dispersion required and other factors, but the pass is made at reasonably high speed to ensure rapid and complete extraction of the dispersing element. On approaching the target zone the timer 26, or other means, is actuated to jettison tail cone 22.

Drag chute 34 is released and opened by the airflow as the aircraft moves forward, the resultant drag pulling the plug 32 from nozzle 30 and extracting the dispersing element 38, which pays out smoothly through the nozzle. With one end of the dispersing element retarded by the drag chute, the entire length of the element is extracted rapidly from the casing and extends in a line along the direction of travel, as in FIGURE 5. As the dispersing element 38 falls relatively slowly toward the ground in substantially horizontally extended configuration, the resultant airflow will extract the fluid from the porous material, the fluid forming a generally vertical sheet or curtain 42. Local winds will disperse the material somewhat, but the general curtain-like distribution will be effective with considerable accuracy over the selected line.

The rate of dispersion is easily controlled by the size of pores in the dispersing element 38. Large pores will permit rapid release of the fluid for a dense curtain, suitable for low altitude distribution with concentration in a small area, while small pores will cause slow release of fluid to provide a vertically extended curtain if required.

The unit need not be carried on an aircraft but could be launched from the ground, or from a ship, by attaching rocket motors 44 at suitable positions on casing 12, as in FIGURE 6. Strap on rockets of this type have been used in many ways for launching, boosting, or propelling an object through the air, various attachment and operating techniques being well known. The rocket boosted unit could also be launched from an aircraft if necessary, to provide increased range and allow the aircraft to stay clear of the target zone. This latter method could be used for controlled dispersal of fluids at any altitude for special purposes.

It will be apparent that the system is adaptable to a variety of uses, yet the apparatus is simple, low in cost, and capable of dispersing a large amount of fluid rapidly in a closely controlled manner.

It is understood that minor variation from the form of the invention disclosed herein may be made without departure from the spirit and scope of the invention, and that the specification and drawings are to be considered as merely illustrative rather than limiting.

I claim:
1. Aerial dispersal means for fluids, comprising:
   a casing for propulsion through the air;
   a porous, fluid carrying, linear dispersing element stored in said casing;
   and means connected to said dispersing element to extract the same continuously in extended linear configuration as said casing is moved through the air.
2. Aerial dispersal means according to claim 1, wherein said last mentioned means comprises aerodynamic drag means releasably mounted on said casing.
3. Aerial dispersing means according to claim 1, wherein said dispersing element comprises an elongated body of open pored sponge-like material.
4. Aerial dispensing means according to claim 3 and including an inelastic reinforcing element longitudinally embedded in said sponge-like material.
5. Aerial dispensing means for fluids, comprising:
   a casing for propulsion through the air;
   a porous, fluid carrying, linear dispersing element stored in said casing;
   a smoothly contoured nozzle in said casing through which said dispersing element is extracted;
   and extraction means connected to said dispersing element and being releasable from said casing to extract the dispersing element continuously as the casing moves through the air.
6. Aerial dispensing means according to claim 5, wherein said extraction means includes a plug normally sealing said nozzle and to which said dispersing element is secured, and aerodynamic drag means attached to said plug.
7. Aerial dispensing means for fluids, comprising:
   an elongated, substantially streamlined casing for propulsion through the air;
   said casing having a nozzle at the rear end thereof;
   a fluid carrying element stored in said casing, said element being composed of an elongated body of open pored sponge-like material having an inelastic reinforcing member embedded therein;
   a plug normally sealing said nozzle and being attached to one end of said reinforcing member;
   and extraction means connected to said plug to extract the plug and pull said dispersing element through said nozzle as said casing is moving through the air.
8. Aerial dispensing means according to claim 7, wherein said extraction means includes a drag parachute attached to said plug, said casing having a releasable rear portion in which said parachute is stowed.

References Cited

UNITED STATES PATENTS

| | | | |
|---|---|---|---|
| 1,284,982 | 11/1918 | Balsillie | 239—2 |
| 2,573,672 | 10/1951 | Reinhardt | 239—47 |
| 2,608,436 | 8/1952 | Baughman | 239—47 |
| 3,098,630 | 7/1963 | Connors | 102—4 X |
| 3,224,369 | 12/1965 | Dunn et al. | 102—34.1 |
| 3,257,077 | 6/1966 | Corning | 239—44 X |

BENJAMIN A. BORCHELT, *Primary Examiner.*

R. F. STAHL, *Assistant Examiner.*